(12) United States Patent
Jeong

(10) Patent No.: US 9,234,997 B2
(45) Date of Patent: Jan. 12, 2016

(54) LIQUID CRYSTAL DISPLAY DEVICE AND ASSEMBLY METHOD THEREOF

(71) Applicant: LG DISPLAY CO., LTD., Seoul (KR)

(72) Inventor: Hae-Hyeon Jeong, Gyeongbuk (KR)

(73) Assignee: LG DISPLAY CO., LTD., Seoul (KR)

( * ) Notice: Subject to any disclaimer, the term of this patent is extended or adjusted under 35 U.S.C. 154(b) by 169 days.

(21) Appl. No.: 13/728,774

(22) Filed: Dec. 27, 2012

(65) Prior Publication Data

US 2014/0092340 A1 Apr. 3, 2014

(30) Foreign Application Priority Data

Sep. 28, 2012 (KR) .................. 10-2012-0108912

(51) Int. Cl.
*F21V 8/00* (2006.01)

(52) U.S. Cl.
CPC .............. *G02B 6/009* (2013.01); *G02B 6/0035* (2013.01); *G02B 6/0065* (2013.01); *G02B 6/0081* (2013.01); *G02B 6/0086* (2013.01); *G02B 6/0091* (2013.01); *Y10T 29/49002* (2015.01)

(58) Field of Classification Search
CPC ............... G02F 1/133528; G02F 1/133308; G02F 1/133504; G02F 1/133512; G02F 1/133524; G02F 1/1336; G02F 1/1339; G02F 1/133603; G02F 1/133604; G02F 1/133606; G02F 1/133608; G02F 1/133509; G02F 2001/133317; G02F 2001/13332; G02F 2001/133325; G02F 2001/133331; G02F 2001/133311; G02F 2001/133314; G02F 2202/28; G02F 2201/503; G02B 6/0001; G02B 6/0011; C09J 2203/318; C09J 7/0246; C09J 7/00; C09J 7/0296; C09J 2201/606; C09J 2205/102; B32B 2405/00; B32B 7/12; B05D 5/10
USPC ............. 349/58, 96, 62, 64, 122, 193, 60, 65, 349/110; 362/97.1, 612, 97.2; 156/60, 156/275.5, 305
See application file for complete search history.

(56) References Cited

U.S. PATENT DOCUMENTS

| | | | |
|---|---|---|---|
| 7,978,284 B2 * | 7/2011 | Hashino | 349/61 |
| 8,026,996 B2 * | 9/2011 | Matsuhira et al. | 349/60 |
| 9,007,754 B2 * | 4/2015 | Wu et al. | 361/679.21 |
| 2007/0132909 A1 | 6/2007 | Oohira | |
| 2009/0185100 A1 | 7/2009 | Matsuhira et al. | |
| 2011/0058121 A1 * | 3/2011 | Yabe | 349/62 |
| 2011/0236643 A1 | 9/2011 | Tsubouchi et al. | |

FOREIGN PATENT DOCUMENTS

| | | |
|---|---|---|
| CN | 101419357 A | 4/2009 |
| CN | 102224445 A | 10/2011 |
| CN | 102332227 A | 1/2012 |

(Continued)

*Primary Examiner* — Thoi Duong

(74) *Attorney, Agent, or Firm* — Birch, Stewart, Kolasch & Birch, LLP

(57) ABSTRACT

Discussed are a liquid crystal display device and an assembly method thereof, which are capable of reducing, as much as possible, the width of a bezel defining an outer appearance of the liquid crystal display device through variation of an assembly structure of a liquid crystal panel and a backlight unit and variation in the size of the backlight unit. The liquid crystal display device can include a backlight unit including a plurality of light sources, a light source holder, and a light guide plate, and a liquid crystal panel arranged at a front side of the backlight unit and fixed to the backlight unit by an adhesive material.

10 Claims, 7 Drawing Sheets

(56) References Cited

FOREIGN PATENT DOCUMENTS

| JP | 2000-89226 | A | 3/2000 |
|---|---|---|---|
| JP | 2001-66579 | A | 3/2001 |
| JP | 2005-10735 | A | 1/2005 |
| JP | 2007-163556 | A | 6/2007 |
| JP | 2009-122655 | A | 6/2009 |
| JP | 4575486 | B2 | 11/2010 |
| KR | 10-2007-0098053 | A | 10/2007 |
| KR | 10-2010-0038877 | A | 4/2010 |

* cited by examiner

LIQUID CRYSTAL DISPLAY DEVICE AND ASSEMBLY METHOD THEREOF

This application claims the benefit of Korean Patent Application No. 10-2012-0108912, filed on Sep. 28, 2012, which is hereby incorporated by reference as if fully set forth herein.

BACKGROUND OF THE INVENTION

1. Field of the Invention

The present invention relates to a liquid crystal display device, to which a backlight unit is assembled, and, more particularly, to a liquid crystal display device and an assembly method thereof, which are capable of reducing, as much as possible, the width of a bezel defining an outer appearance of the liquid crystal display device through variation of an assembly structure of a liquid crystal panel and a backlight unit and variation in the size of the backlight unit.

2. Discussion of the Related Art

As flat panel display devices used for monitors of personal computers, portable terminals and various information appliances, a liquid crystal display device, a plasma display device, a field emission display device and a light emitting display device have recently been highlighted.

In such a flat panel display device, a display panel to display an image is assembled within a front cover or a back cover, which forms an outer appearance of the flat panel display device in a state of being seated on a guide bracket, a panel guide or the like, which is separately provided. In particular, in the case of a liquid crystal display device, a liquid crystal display panel is assembled with a panel guide and a back cover under the condition that a backlight unit or the like is additionally installed at a back side of the liquid crystal display panel because the liquid crystal display panel is not self-luminous.

In order to meet various demands of consumers for improved design and light and thin structure, development of a liquid crystal display device, to which an edge type backlight unit having light emitting diodes to supply light at a side of the backlight unit is applied, and, in which a bezel defining an outer appearance of the liquid crystal display device has as small a thickness as possible, has been required.

In conventional cases, however, there is a limitation in reducing the size or width of the bezel due to a size difference between the liquid crystal panel and the backlight unit, that is, because the backlight unit has a greater size than the liquid crystal panel. In particular, the conventional liquid crystal panel is assembled with the backlight unit in a state of being fixed to a panel guide or is fixed to a fixed structure such as guide bracket by a light shield tape or the like. For this reason, reduction of the size or width of the bezel is further limited, taking into consideration the size of the panel guide, the bonding area of the light shield tape, etc.

SUMMARY OF THE INVENTION

Accordingly, the present invention is directed to a liquid crystal display device and an assembly method thereof that substantially obviate one or more problems due to limitations and disadvantages of the related art.

An object of the present invention is to provide a liquid crystal display device and an assembly method thereof, which are capable of reducing, as much as possible, the width of a bezel defining an outer appearance of the liquid crystal display device through variation of an assembly structure of a liquid crystal panel and a backlight unit and variation in the size of the backlight unit.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display device includes a backlight unit including a plurality of light sources, a light source holder, and a light guide plate, and a liquid crystal panel arranged at a front side of the backlight unit and fixed to the backlight unit by an adhesive material.

The backlight unit may include the plural light sources, which generate light, the light source holder, which is disposed at an inner side surface of a bottom cover in a fixed state, to hold the light sources, a light guide plate for receiving light from each of the light sources at a light incidence surface formed at a side surface of the light guide plate, and emitting the light after changing a travel direction of the light toward a front surface of the light guide plate, a plurality of optical sheets disposed on the light guide plate, to emit light received from the light guide plate and light received at light incidence surfaces formed at side surfaces of the optical sheets in a direction perpendicular to the light incidence surfaces of the optical sheets, a light-shieldable tape disposed on the light source holder and a front surface portion of a foremost one of the optical sheets along a peripheral portion of the foremost optical sheet, to fix the light source holder and the optical sheets, and a reflection sheet formed on an inner bottom surface of the bottom cover, to reflect the light from the light guide plate. The bottom cover may be directly attached, at top surfaces of side walls thereof, to a back surface of the liquid crystal panel.

The backlight unit may have a front surface width or area equal to or smaller than a front surface width or area of the liquid crystal panel.

The front surface width or area of the backlight unit may be smaller than the front surface width or area of the liquid crystal panel. The adhesive material may be coated on a portion of the back surface of the liquid crystal panel and a portion of a side surface of the backlight unit along an area where the back surface of the liquid crystal panel and a front surface of the backlight unit contact, to fix the liquid crystal panel and the backlight unit in a cured state of the coated adhesive material.

The adhesive material may be formed on the top surfaces of the side walls of the bottom cover in the backlight unit and a bonding surface provided at the back surface of the liquid crystal panel, to firmly bond the top surfaces of the side walls of the bottom cover and the bonding surface of the liquid crystal panel.

The liquid crystal display device may further include a bezel formed along an edge of a front surface of the liquid crystal panel.

The light source holder may include a flexible printed circuit board or a printed circuit film to supply drive power transferred from outside to the plural light sources.

The plural light sources held by the light source holder may be firmly fitted in light source fitting grooves formed at the top surface of one of the side walls in the bottom cover, respectively.

In another aspect of the present invention, an assembly method of a liquid crystal display device includes the steps of preparing a backlight unit including a plurality of light sources, a light source holder and a light guide plate, and fixing a liquid crystal panel to a front surface of the backlight unit by an adhesive material.

The step of preparing the backlight unit may include the steps of mounting the plural light sources on the light source holder, and fixing the light source holder to an inner bottom surface of a bottom cover along a side edge of the bottom cover, forming a reflection sheet on the inner bottom surface of the bottom cover, disposing the light guide plate within the bottom cover such that the light guide plate receives light from the light sources at a light incidence surface provided at a side surface of the light guide plate, and changes a travel direction of the received light toward a front surface of the light guide plate, arranging a plurality of optical sheets on the light guide plate, and fixing the optical sheets and the light source holder by use of a light-shieldable tape. The bottom cover may be directly attached, at top surfaces of side walls thereof, to a back surface of the liquid crystal panel at the step of fixing the backlight unit and the liquid crystal panel.

The backlight unit may have a front surface width or area equal to or smaller than a front surface width or area of the liquid crystal panel.

The front surface width or area of the backlight unit may be smaller than the front surface width or area of the liquid crystal panel. The step of fixing the backlight unit and the liquid crystal panel may include the steps of coating the adhesive material on a portion of the back surface of the liquid crystal panel and a portion of a side surface of the backlight unit along an area where the back surface of the liquid crystal panel and a front surface of the backlight unit contact, and curing the coated adhesive material.

The step of fixing the backlight unit and the liquid crystal panel may include the step of forming the adhesive material on the top surfaces of the side walls of the bottom cover in the backlight unit and a bonding surface provided at the back surface of the liquid crystal panel, to firmly bond the top surfaces of the side walls of the bottom cover and the bonding surface of the liquid crystal panel.

The assembly method may further include the step of forming a bezel along an edge of a front surface of the liquid crystal panel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and along with the description serve to explain the principle of the invention. In the drawings.

DETAILED DESCRIPTION OF THE INVENTION

Reference will now be made in detail to the preferred embodiments of the present invention associated with a liquid crystal display device and an assembly method thereof, examples of which are illustrated in the accompanying drawings.

Figure 1:
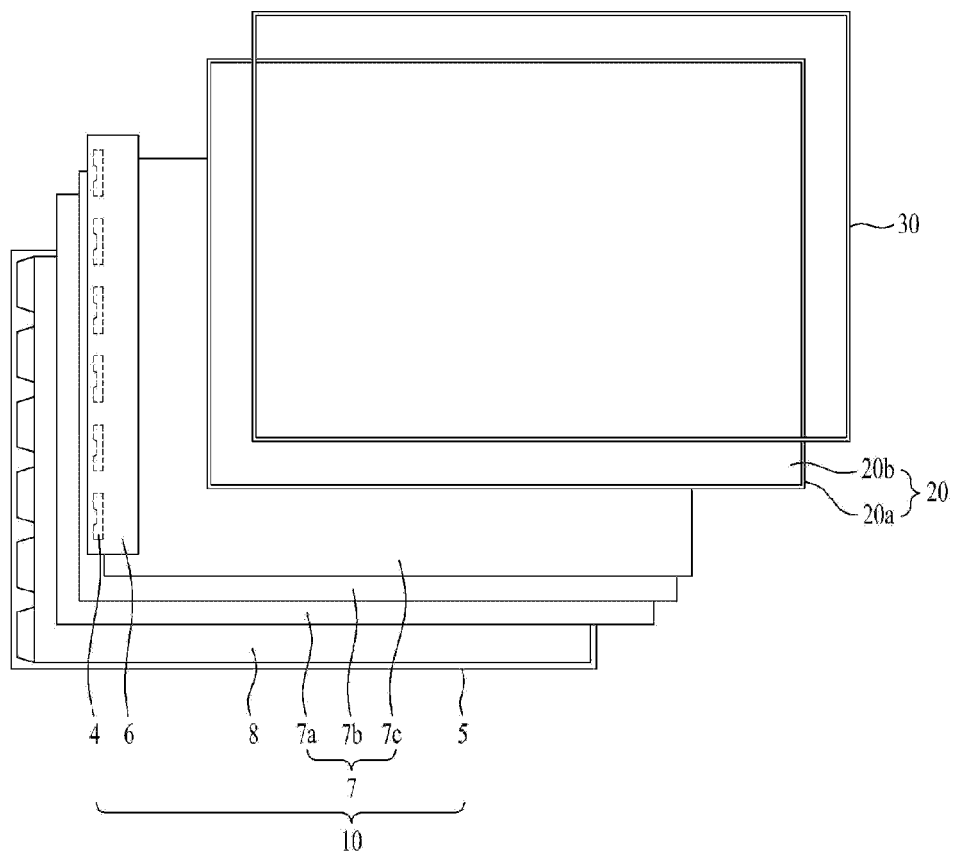
FIG. 1 is an exploded perspective view schematically illustrating a liquid crystal display device according to an exemplary embodiment of the present invention.

FIG. 1 is an exploded perspective view schematically illustrating a liquid crystal display device according to an exemplary embodiment of the present invention.

The liquid crystal display device shown in FIG. 1 includes a backlight unit 10 including a plurality of light sources 4, a light source holder 6, and a light guide plate 8. The liquid crystal display device also includes a liquid crystal panel 20 arranged at a front side of the backlight unit 10 and fixed to the backlight unit 10 by an adhesive material such as glue or a liquid display module including the liquid crystal panel 20, and a bezel 30 formed along an edge of a front surface of the liquid crystal display module.

As the liquid crystal panel 20, general liquid crystal panels, which are commercially available, may be employed. The liquid crystal panel 20 or the liquid crystal display module including the liquid crystal panel 20 is arranged at the front side of the backlight unit 10 in a fixed state, to display an image through adjustment of transmittance of light from the backlight unit 10.

Although not shown in detail, the liquid crystal panel 20 includes a lower substrate, an upper substrate, liquid crystals formed between the lower substrate and the upper substrate, and a spacer for maintaining a desired spacing between the lower substrate and the upper substrate. The liquid crystal panel 20 will be described more in brief. The upper surface of the liquid crystal panel 20 includes a color filter, a black matrix, and a common electrode. The lower substrate includes thin film transistors respectively formed in cell regions defined by data lines and gate lines, and pixel electrodes connected to respective thin film transistors. The common electrode may be formed at the lower substrate, in place of the upper substrate, in accordance with the mode of liquid crystals.

In addition to the liquid crystal panel 20, the liquid crystal display module further includes a circuit configuration for driving the liquid crystal panel 20. Although not shown, a plurality of data circuit films, on which data integrated circuits to drive the data lines are mounted, is attached to at least one side surfaces of the liquid crystal panel 20. Alternatively, the data integrated circuits may be mounted on the lower substrate in a chip-on-glass manner. Gate integrated circuits to drive the gate lines are mounted on at least one of the remaining side surfaces of the liquid crystal panel 20. Alternatively, the gate integrated circuits may be formed on the lower substrate in a process of manufacturing the thin film transistors.

The bezel 30 may be attached to a portion of a non-display region on a front surface of the liquid crystal panel 20. Alternatively, the bezel 30 may be formed to enclose the non-display region on the front surface of the liquid crystal panel 20 and the side surfaces of the liquid crystal panel 20. The size or width of the bezel 30 may be varied in accordance with the area of the front non-display region of the liquid crystal panel 20, the attachment area of the bezel 30, or the material of the bezel 30. When the bezel 30 is made of a thin plate metal material, it is possible to manufacture the bezel 30 such that it has a width of 0.01 mm or less. Taking into consideration design factors, the bezel 30 may have various shapes or various attachment structures. Of course, the bezel 30 may be dispensed with.

Figure 2:
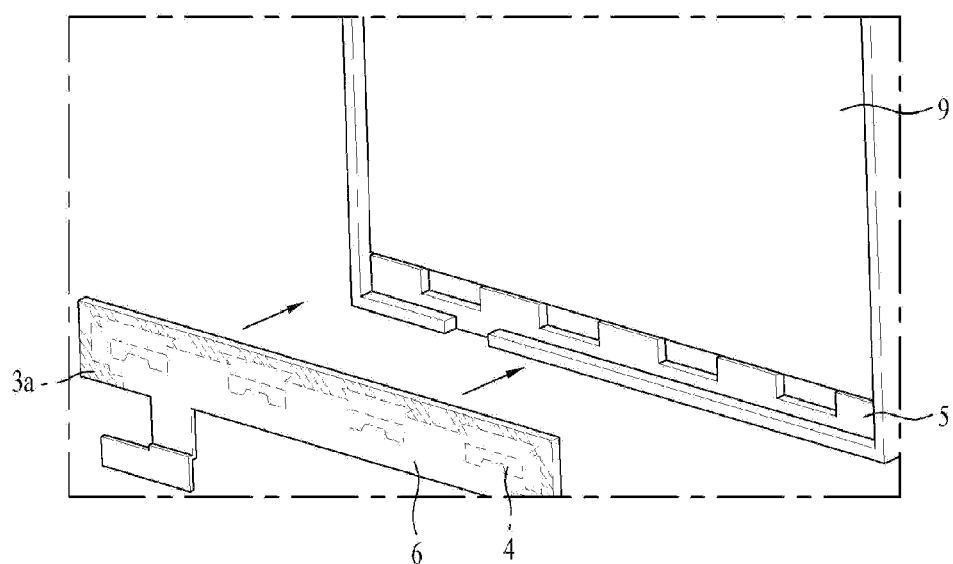
FIG. 2 is an exploded perspective view illustrating a light source holder and a light guide plate, which are shown in FIG. 1, before assembly thereof to a bottom cover.
Figure 3:
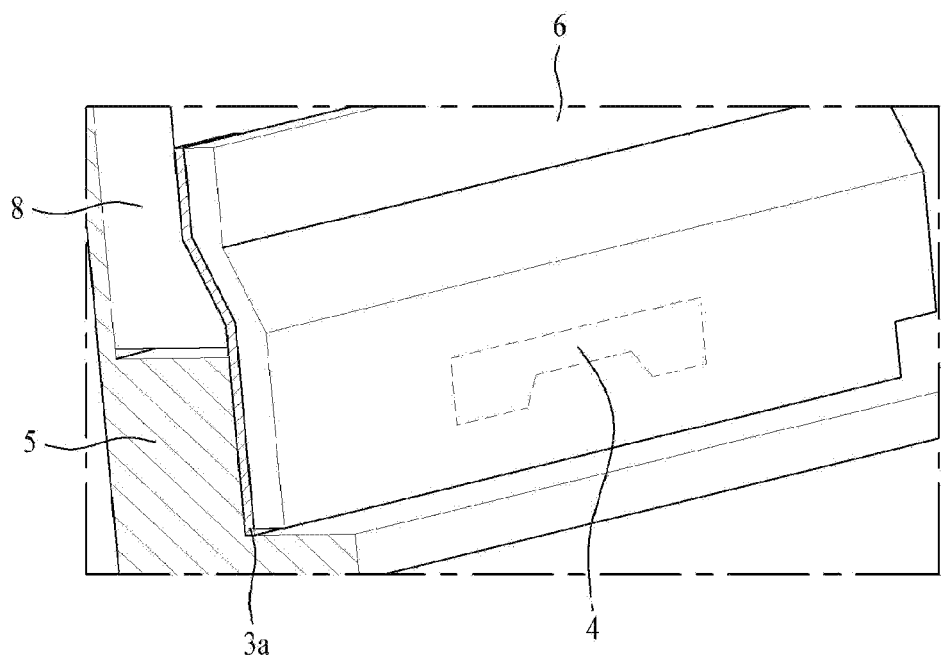
FIG. 3 is a perspective view illustrating a condition that a portion of the light source holder shown in FIG. 2 is attached in a bent state.

FIG. 2 is an exploded perspective view illustrating the light source holder and light guide plate shown in FIG. 1 before assembly thereof to a bottom cover. FIG. 3 is a perspective view illustrating a condition that a portion of the light source holder shown in FIG. 2 is attached in a bent state.

Referring to FIGS. 2 and 3 together with FIG. 1, the backlight unit 10 includes a plurality of light sources 4 for generating light, a light source holder 6 disposed at an inner side surface of a bottom cover 5 in a fixed state, to hold a plurality of light sources 4, and a light guide plate 8 for receiving light from each light source 4 at a light incidence surface formed at a side surface of the light guide plate 8, and emitting the light after changing the travel direction of the light toward a front surface of the light guide plate 8. The backlight unit 10 also includes a plurality of optical sheets 7 disposed on the light guide plate 8, to emit light received from the light guide plate 8 and light received at light incidence surfaces formed at side surfaces of the optical sheets 7 in a direction perpendicular to the light incidence surface of the optical sheets 7.

The front surface of the backlight unit 10 having the above-described configuration, in particular, a top surface portion of the bottom cover 5 along an edge of the bottom cover 5, is directly attached to a back surface of the liquid crystal panel 20 or a back surface of the liquid crystal display module including the liquid crystal panel 20.

Each of the light sources 4 is attached to a front surface or back surface of the light source holder 6 such that it is disposed on the inner bottom surface of the bottom cover 5 along a side edge of the bottom cover 5 when the light source holder 6 is fixed in position. In this case, the light sources 4 are disposed to face the light incidence surface formed at one side surface of the light guide plate 8 while being firmly fitted in light source fitting grooves formed at a top surface of one side wall of the bottom cover 5, respectively. As each light source 4, a light emitting diode may be employed. The light sources 4, namely, the light emitting diodes, are turned on by drive power supplied via the light source holder 6, to emit light toward the light incidence surfaces of the light guide pate 8 and optical sheets 7.

The light sources 4 are mounted on the light source holder 6. The light source holder 6 is fixed to a position where one edge of a mounting surface of the light source holder 6, on which the light sources 4 are mounted, corresponds to one edge of the front surface of the light guide plate 8, and the other edge of the mounting surface corresponds to a portion of the top surface of the bottom cover 5. As shown in FIG. 2, the light source holder 6 is firmly attached to the top surface portion of the bottom cover 5 and the front surface portion of the light guide plate 8 by a separate fixing tape 3a. The fixing tape 3a is attached to the front surface of the light source holder 6 in the form of a bridge such that it surrounds the light sources 4, to cause a surface portion of the light source holder 6 to be firmly attached to the light guide plate 8 and bottom cover 5. Accordingly, the light sources 4 are disposed at the inner side surface of the bottom cover 5 in a state of being fixed to the light source holder 6 such that one side surface of the light guide plate 8 is directed to the light emission direction of the light sources 4. The light source holder 6 is constituted by a flexible printed circuit board or a printed circuit film so as to supply drive power received from outside to the light sources 4.

The light guide plate 8 is layered on an opening-formed top portion of the bottom cover 5, which has a quadrangular frame structure, namely, an inner bottom surface of the bottom cover 5. A reflection sheet 9 may be further formed on the inner bottom surface of the bottom cover 5. As shown in FIG. 3, the light incidence surface formed at the side surface of the light guide plate 8 layered on the inner bottom surface of the bottom cover 5 faces the light emission surfaces of the light sources 4. The light guide plate 8 changes the travel path of light emitted toward the light incidence surface, to diffuse the light over the front surface of the light guide plate 8, namely, the entire region of the back surface of the liquid crystal panel 20.

The optical sheets 7 adjust an optical path such that light incident upon the optical sheets 7 in a diffused state via the light guide plate 8 is irradiated to the liquid crystal panel 20 in a perpendicular direction. To this end, the optical sheets 7 may include at least one prism sheet 7a for condensing light diffused by the light guide plate 8, a diffusion sheet 7b, a polarization sheet 7c, and a protective sheet (not shown). In this case, the kinds and lamination order of the laminated sheets may be appropriately determined in accordance with the application of the backlight unit 10.

The bottom cover 5 has a quadrangular frame structure having four side walls defining a rectangular shape, a trapezoidal shape, or an equilateral trapezoidal shape in which an upper side is longer than a lower side. An opening is formed through a top of the bottom cover 5. The following description will be given in conjunction with the case in which the bottom cover 5 has a quadrangular frame structure having four side walls defining a rectangular shape.

Figure 4A:
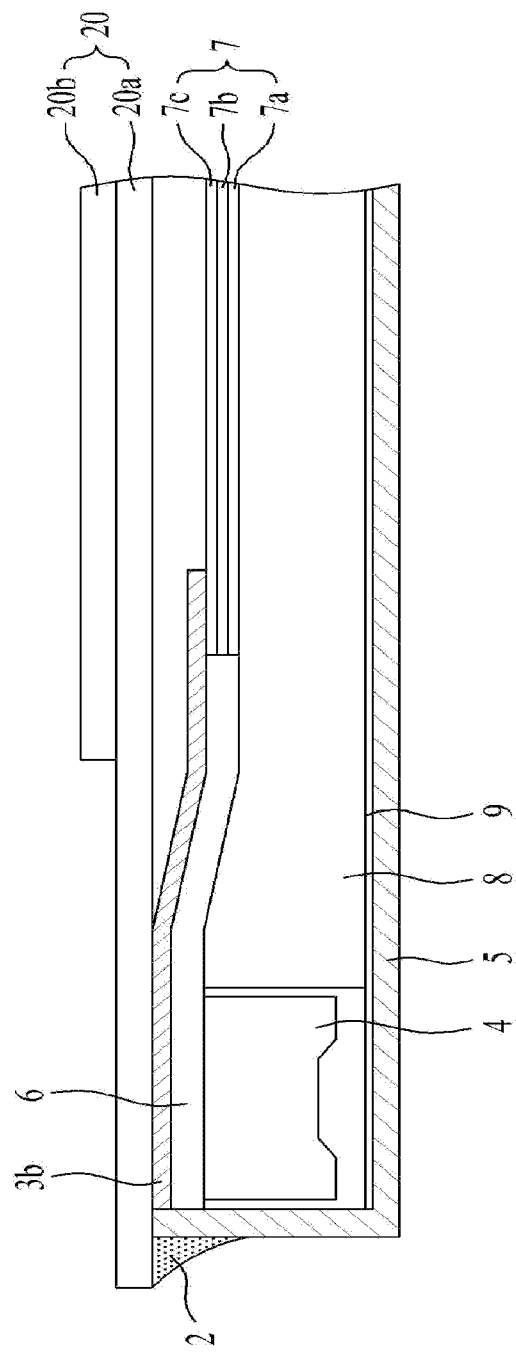
FIGS. 4a and 4b are sectional views illustrating an assembly of a backlight unit and a liquid crystal panel according to a first embodiment of the present invention.
Figure 4B:
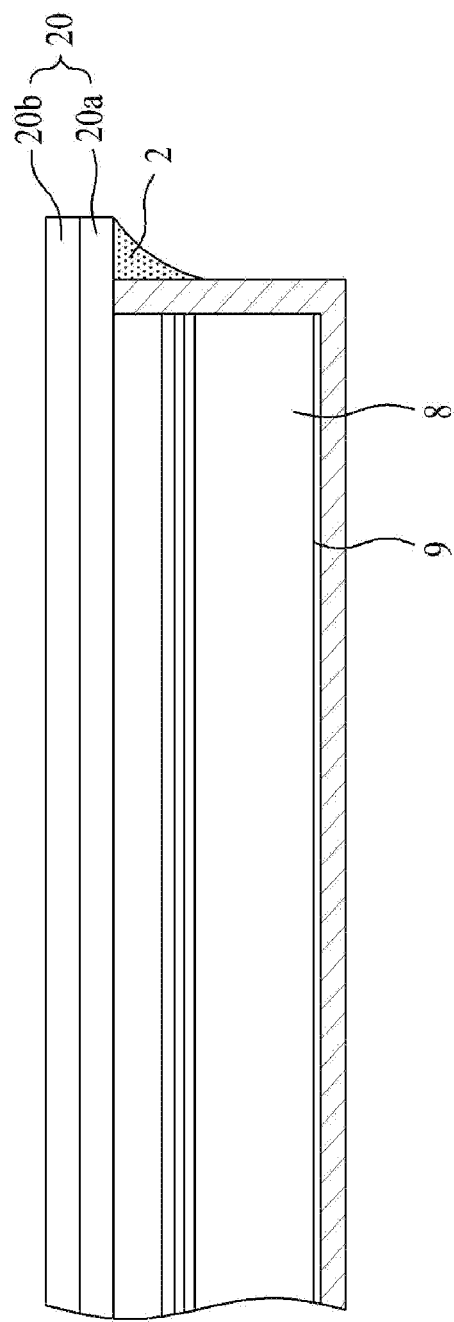

FIGS. 4a and 4b are sectional views illustrating an assembly of the backlight unit and liquid crystal panel according to a first embodiment of the present invention.

In detail, FIG. 4a is a sectional view illustrating one side of the assembly in which the backlight unit and liquid crystal panel are fixed by a separate adhesive material. FIG. 4B is a sectional view illustrating the other side of the assembly in which the backlight unit and liquid crystal panel are fixed by the separate adhesive material.

As shown in FIGS. 4a and 4b, the light guide plate 8, the light source holder 6 and the plural optical sheets 7 are sequentially layered on the inner bottom surface of the bottom cover 5 formed with the reflection sheet 9. A light shield tape 3b is attached to the light source holder 6 and a surface portion of a foremost one of the optical sheets 7.

After completion of assembly of the backlight unit 10, the liquid crystal panel 20 or the liquid crystal display module including the liquid crystal panel 20 is seated on the front surface of the backlight unit 10. As shown in FIGS. 4a and 4b, the front surface of the backlight unit 10 may have a greater area or width than that of the back surface of the liquid crystal panel 20.

When the backlight unit 10, which has a smaller area or width than that of the back surface of the liquid crystal panel 20, contacts the back surface of the liquid crystal panel 20 or the back surface of the liquid crystal display module, an adhesive material 2 such as glue is coated on a portion of the back surface of the liquid crystal panel 20 and a portion of the side surface of the backlight unit 10 along an area where the liquid crystal panel 20 and backlight unit 10 contact. That is, the adhesive material 2 is coated to surround the contact area of the backlight unit 10 and liquid crystal panel 20.

Thereafter, the adhesive material 2 coated to surround the contact area of the backlight unit 10 and liquid crystal panel 20 is cured, the backlight unit 10 and liquid crystal panel 20 are fixed by the cured adhesive material 2. As the adhesive material 2, a light-shieldable adhesive material is preferably used so as to prevent leakage of light from the backlight unit 10.

When the liquid crystal panel 20 and backlight unit 10 are firmly bonded by the separate adhesive material 2, as described above, the bezel 30, which forms an outer appearance of the liquid crystal display device, may be formed only in an image non-display region, if necessary. In this regard, the bezel 30 may have a minimum width of 1.0 mm or less. When the width or area of the front surface of the backlight unit 10 is smaller than that of the back surface of the liquid crystal panel 20, it is possible not only to reduce the size of the backlight unit 10 and the manufacturing cost of the backlight unit 10, but also to achieve an enhancement in assembly efficiency.

Figure 5A:
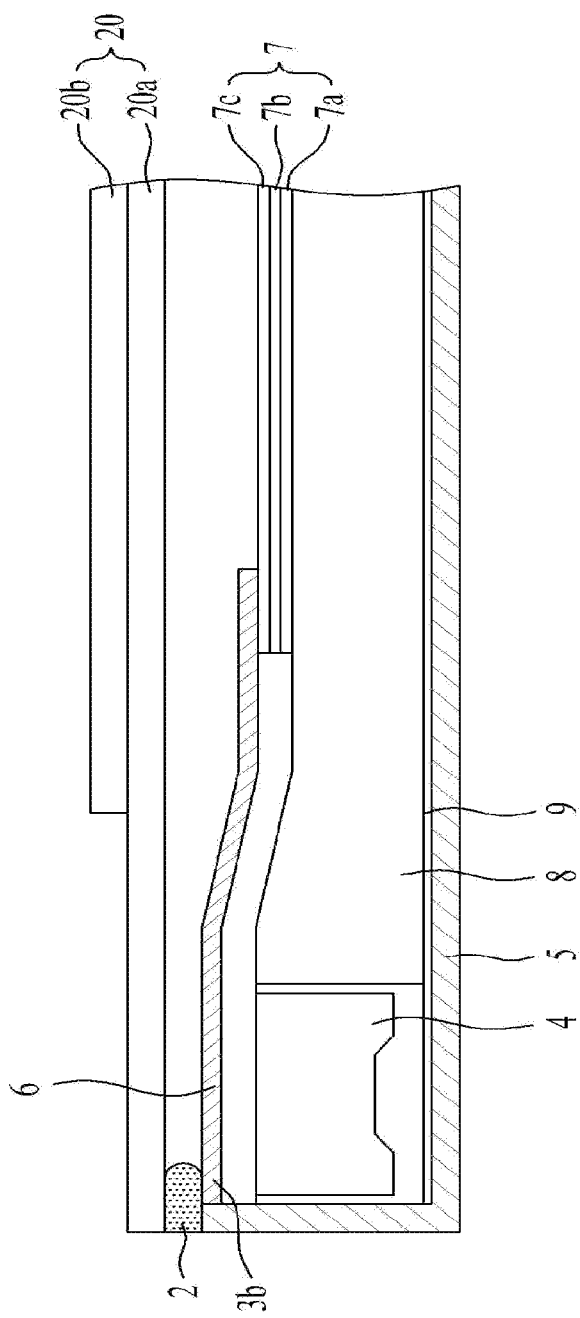
FIGS. 5a and 5b are sectional views illustrating an assembly of the backlight unit and liquid crystal panel according to a second embodiment of the present invention.
Figure 5B:
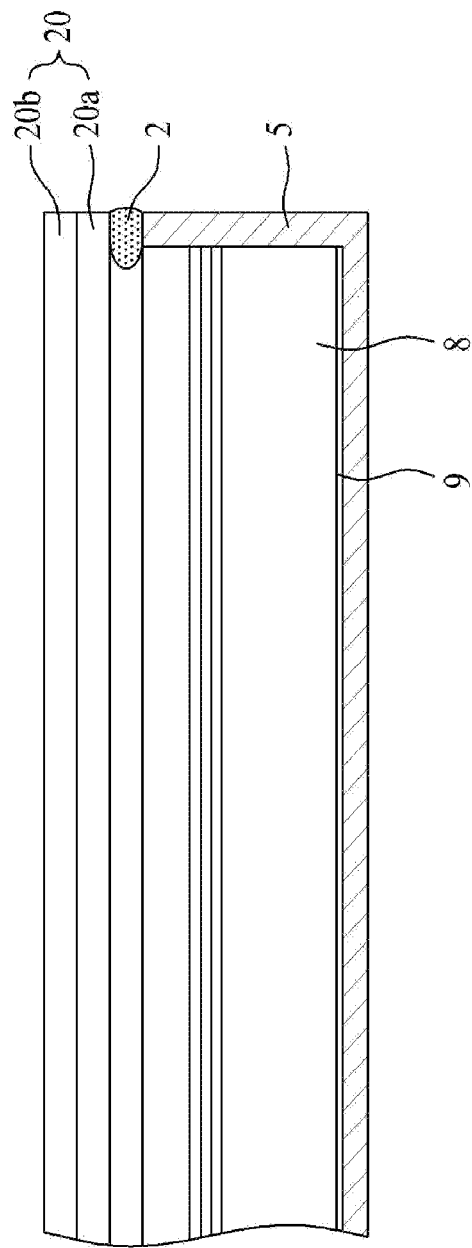

FIGS. 5a and 5b are sectional views illustrating an assembly of the backlight unit and liquid crystal panel according to a second embodiment of the present invention.

In detail, FIG. 5a is a sectional view illustrating one side of the assembly in which the backlight unit and liquid crystal panel are fixed by a separate adhesive material. FIG. 5b is a sectional view illustrating the other side of the assembly in which the backlight unit and liquid crystal panel are fixed by the separate adhesive material.

As shown in FIGS. 5a and 5b, the light guide plate 8, the light source holder 6 and the plural optical sheets 7 are sequentially layered on the inner bottom surface of the bottom cover 5 formed with the reflection sheet 9. A light shield tape 3b is attached to the light source holder 6 and a surface portion of a foremost one of the optical sheets 7.

After completion of assembly of the backlight unit 10, the liquid crystal panel 20 or the liquid crystal display module including the liquid crystal panel 20 is firmly bonded to the front surface of the backlight unit 10. In other words, the top surfaces of the side walls of the bottom cover 5 are bonded to a bonding surface portion of the back surface of the liquid crystal panel 20 by the separately-coated adhesive material 2. In this case, the area or width of the front surface of the backlight unit 10 may be equal to that of the back surface of the liquid crystal panel 20, as shown in FIGS. 5a and 5b.

The adhesive material 2 is first coated over at least one of the top surface of each side wall of the bottom cover 5 disposed at the front side of the backlight unit 10 and the bonding surface portion of the back surface of the liquid crystal panel 20. Accordingly, the top surface of each side wall of the bottom cover 5 and the bonding surface portion of the back surface of the liquid crystal panel 20 are firmly bonded by the adhesive material 2.

When the adhesive material 2 coated on the contact area of the backlight unit 10 and liquid crystal panel 20 is cured, the backlight unit 10 and liquid crystal panel 20 are fixed by the cured adhesive material 2. As the adhesive material 2, a light-shieldable adhesive material is preferably used so as to prevent leakage of light from the backlight unit 10.

Since the top surfaces of the side walls of the bottom cover 5 are bonded to the bonding surface portion of the back surface of the liquid crystal panel 20, the area or width of the front surface of the backlight unit 10 may be equal to that of the back surface of the liquid crystal panel 20.

When the liquid crystal panel 20 and backlight unit 10 are firmly bonded by the separate adhesive material 2, as described above, the bezel 30 may have a minimum width of 1.0 mm or less, if necessary. When the width or area of the front surface of the backlight unit 10 is equal to that of the back surface of the liquid crystal panel 20, it is possible not only to reduce the size of the backlight unit 10 and the manufacturing cost of the backlight unit 10, but also to achieve an enhancement in assembly efficiency. In particular, it is possible to simplify bonding and assembly of the liquid crystal panel 20 and backlight unit 10, using the adhesive material 2. Thus, it is unnecessary to use a separate structure such as a panel guide and, as such, the manufacturing cost of the liquid crystal display device can be reduced.

As apparent from the above description, in accordance with the liquid crystal display device and assembly method thereof according to each of the illustrated embodiments of the present invention, it is possible to reduce the width of a bezel defining an outer appearance of the liquid crystal display device to 1.0 mm or less through variation of an assembly structure of the liquid crystal panel and backlight unit and variation in the size of the backlight unit.

Also, it is possible to reduce the manufacturing cost of the backlight unit and to achieve an enhancement in assembly efficiency by forming the backlight unit and liquid crystal panel such that the width or area of the front surface of the backlight unit is smaller than or equal to that of the back surface of the liquid crystal panel.

In addition, it is possible to simplify bonding and assembly of the liquid crystal panel and backlight unit by firmly bonding the liquid crystal panel and backlight unit, using a separate light-shieldable adhesive material such as glue. Thus, it is unnecessary to use a separate structure such as a panel guide or a guide bracket and, as such, the manufacturing cost of the liquid crystal display device can be reduced.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device comprising:
   a backlight unit comprising a plurality of light sources, a light source holder, a light guide plate, and a bottom cover holding the plurality of light sources, the light source holder and the light guide plate;
   a liquid crystal panel arranged at a front side of the backlight unit and fixed to the backlight unit by an adhesive material; and
   an adhesive material coated on both a portion of a back surface of the liquid crystal panel and a portion of an outer side surface of the backlight unit,
   wherein the backlight unit has a front surface width or area smaller than a front surface width or area of the liquid crystal panel so that at least one end of the liquid crystal panel extends past a side wall of the bottom cover, and
   wherein a maximum width of the adhesive material is equal to a width of the portion of the back surface of the liquid crystal panel on which the adhesive material is coated.

2. The liquid crystal display device according to claim 1, wherein:
   the backlight unit comprises the plural light sources, which generate light, the light source holder, which is disposed at an inner side surface of the bottom cover in a fixed state, to hold the light sources, a light guide plate for receiving light from each of the light sources at a light incidence surface formed at a side surface of the light guide plate, and emitting the light after changing a travel direction of the light toward a front surface of the light guide plate, a plurality of optical sheets disposed on the light guide plate, to emit light received from the light guide plate and light received at light incidence surfaces formed at side surfaces of the optical sheets in a direction perpendicular to the light incidence surfaces of the optical sheets, a light-shieldable tape disposed on the light source holder and a front surface portion of a foremost one of the optical sheets along a peripheral portion of the foremost optical sheet, to fix the light source holder and the optical sheets, and a reflection sheet formed on an inner bottom surface of the bottom cover, to reflect the light from the light guide plate; and the bottom cover is directly attached, at top surfaces of side walls thereof, to the back surface of the liquid crystal panel.

3. The liquid crystal display device according to claim 2, wherein the adhesive material is further coated along an area where the back surface of the liquid crystal panel and the front surface of the backlight unit contact, to fix the liquid crystal panel and the backlight unit in a cured state of the coated adhesive material.

4. The liquid crystal display device according to claim 2, wherein the light source holder comprises a flexible printed circuit board or a printed circuit film to supply drive power transferred from outside to the plural light sources.

5. The liquid crystal display device according to claim 2, wherein the plural light sources held by the light source holder are firmly fitted in light source fitting grooves formed at the top surface of one of the side walls in the bottom cover, respectively.

6. The liquid crystal display device according to claim 1, further comprising;
a bezel formed along an edge of a front surface of the liquid crystal panel.

7. An assembly method of a liquid crystal display device, the method comprising:
preparing a backlight unit including a plurality of light sources, a light source holder a light guide plate, and a bottom cover to hold the plurality of light sources, the light source holder and the light guide plate; and
fixing a liquid crystal panel to a front surface of the backlight unit by an adhesive material coated on both a portion of a back surface of the liquid crystal panel and a portion of an outer side surface of the backlight unit,
wherein the backlight unit has a front surface width or area smaller than a front surface width or area of the liquid crystal panel so that at least one end of the liquid crystal panel extends past a side wall of the bottom cover, and
wherein a maximum width of the adhesive material is equal to a width of the portion of the back surface of the liquid crystal panel on which the adhesive material is coated.

8. The assembly method according to claim 7, wherein:
the preparing of the backlight unit comprises mounting the plural light sources on the light source holder, and fixing the light source holder to an inner bottom surface of the bottom cover along a side edge of the bottom cover, forming a reflection sheet on the inner bottom surface of the bottom cover, disposing the light guide plate within the bottom cover such that the light guide plate receives light from the light sources at a light incidence surface provided at a side surface of the light guide plate, and changes a travel direction of the received light toward a front surface of the light guide plate, arranging a plurality of optical sheets on the light guide plate, and fixing the optical sheets and the light source holder by use of a light-shieldable tape; and
the bottom cover is directly attached, at top surfaces of side walls thereof, to the back surface of the liquid crystal panel at the fixing of the backlight unit and the liquid crystal panel.

9. The assembly method according to claim 8,
wherein the fixing of the backlight unit and the liquid crystal panel further comprises coating the adhesive material along an area where the back surface of the liquid crystal panel and a front surface of the backlight unit contact, and curing the coated adhesive material.

10. The assembly method according to claim 7, further comprising
forming a bezel along an edge of a front surface of the liquid crystal panel.

* * * * *